No. 820,640. PATENTED MAY 15, 1906.
W. GABRIELSON.
ANIMAL OR FISH TRAP.
APPLICATION FILED MAR. 20, 1905. RENEWED NOV. 11, 1905.

Witnesses:
R. E. Hamilton,
K. Imboden.

Inventor,
William Gabrielson,
by
Higdon & Higdon, attys.

UNITED STATES PATENT OFFICE.

WILLIAM GABRIELSON, OF KANSAS CITY, MISSOURI, ASSIGNOR OF ONE-SIXTH TO WILLIAM D. BOYLE, ONE-SIXTH TO ERICK LASON, AND ONE-SIXTH TO PITT LASON, OF KANSAS CITY, MISSOURI.

ANIMAL OR FISH TRAP.

No. 820,640.      Specification of Letters Patent.      Patented May 15, 1906.

Application filed March 20, 1905. Renewed November 11, 1905. Serial No. 286,792.

*To all whom it may concern:*

Be it known that I, WILLIAM GABRIELSON, a citizen of the United States, residing at Kansas City, in the county of Jackson and State of Missouri, have invented a new and useful Animal or Fish Trap, of which the following is a specification.

My invention relates to traps for catching fish or small animals; and my object is to produce a trap which is simple in construction, certain of operation, and cheap to manufacture.

Figure 1:
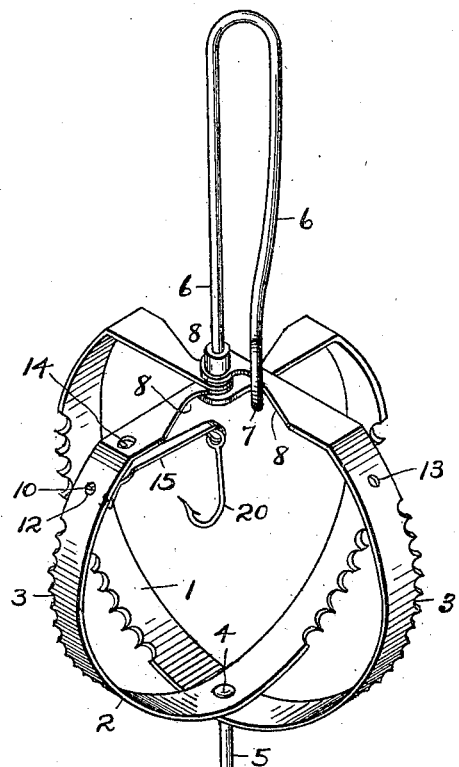
Figure 2:
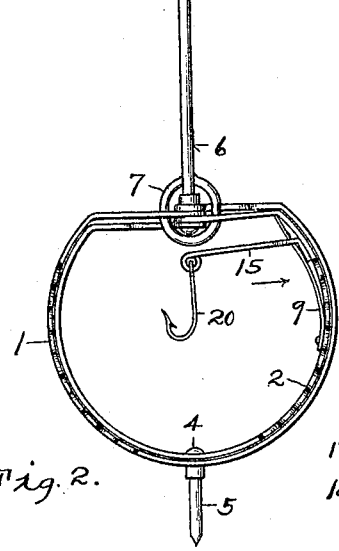
Figures 3, 4, 5:
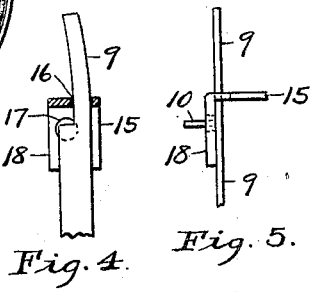

Referring to the accompanying drawings, Figure 1 is a perspective view of a trap embodying my invention, the jaws being shown half-way between open position and closed position. Fig. 2 is an elevational view in set position. Fig. 3 is an enlarged sectional detail of the bait-holder, the trigger, and the spring that holds the jaws in set position. Fig. 4 is a detail view looking in the direction of the arrow in Fig. 2, the trigger being sectioned. Fig. 5 is a detail view of the same parts, showing the spring edgewise, the trigger being broken off.

1 and 2 designate the jaws of the trap, 1 being the outer and 2 the inner jaw. Two opposite edges of each jaw are provided with teeth 3, between which the victim is caught when the trap is sprung. The jaws are pivotally connected at 4 by a pin 5, which is purposely extended so that it may be stuck into the ground and the trap thereby supported. Opposite this pin the jaws are pivoted upon the end of a round rod, stem, or spring 6. This spring is bent back upon itself and terminates in an eye 7, which loosely embraces both jaws, as shown in Fig. 1. The tendency of the spring is to open out or push the eye 7 away from the pivotal point, whereby it forces the jaws quickly together.

Recesses 8 are cut in the jaws to pass the eye 7 when the jaws are set. The trap is shown set, as aforesaid, in Fig. 2.

The lock or detent piece consists of a flat spring 9, riveted to the inner jaw 2 and having an outwardly-bent portion 10, which extends through a hole 12 in the jaw far enough to enter a corresponding hole 13 in the outer jaw 1. The upper end of spring 9 is held loosely in a hole 14, and thereby any lateral or excessive inward movements are prevented.

The trigger 15 is formed of a single piece of metal having an opening 16 therein, through which the spring 9 passes, and also having an opening 17, through which the outwardly-bent lug 10 extends. Thus the trigger is supported. A portion thereof (marked 18) is bent downwardly and lies between spring 9 and the inner face of jaw 2. The opposite end is bent into an eye 19 for supporting a bait-holder 20. As shown, a barbed hook is employed for this purpose.

The trap is set by forcing apart the jaws until the lug 10 of spring 9 registers with and enters the hole 13 in the outer jaw 1. The trap is now set. Any slight disturbance of the hook 20 will cause the trigger 15 to retract the lug 10 from said hole 13. The spring 6 acts instantaneously and the jaws fly around to a reverse position, catching the fish or animal therebetween.

When used for catching fish, the trap is suspended by a line attached to the bend of the part 6.

Having now described my invention, what I claim as new, and desire to secure by Letters Patent, is—

A trap consisting of an outer and an inner jaw, the ends of each jaw being brought together and pivotally connected, a spring, one end of which forms such pivotal connection, the opposite end of said spring terminating in an eye which loosely embraces both jaws in the manner shown, a spring 9 secured to the inner jaw and provided with a lug which projects outwardly through said jaw, the outer jaw having an opening therein adapted to receive said lug when the trap is set, a trigger supported by said spring 9, and a bait-holder supported by the trigger; substantially as specified.

In testimony whereof I affix my signature in the presence of two witnesses.

WILLIAM GABRIELSON.

Witnesses:
K. IMBODEN,
F. B. MANN.